United States Patent
Wang et al.

(10) Patent No.: US 12,126,180 B2
(45) Date of Patent: Oct. 22, 2024

(54) MEDIUM-VOLTAGE PHOTOVOLTAIC GRID-CONNECTION INVERTER SYSTEM, AND PHOTOVOLTAIC POWER GENERATION SYSTEM

(71) Applicant: Sungrow Power Supply Co., Ltd., Hefei (CN)

(72) Inventors: Hang Wang, Hefei (CN); Li Ren, Hefei (CN); Peng Sun, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 51 days.

(21) Appl. No.: 17/915,992

(22) PCT Filed: Sep. 17, 2021

(86) PCT No.: PCT/CN2021/118973
§ 371 (c)(1),
(2) Date: Sep. 29, 2022

(87) PCT Pub. No.: WO2022/121430
PCT Pub. Date: Jun. 16, 2022

(65) Prior Publication Data
US 2023/0163600 A1    May 25, 2023

(30) Foreign Application Priority Data
Dec. 7, 2020  (CN) .......................... 202011426034.9

(51) Int. Cl.
*H02J 3/40* (2006.01)
*H02J 3/38* (2006.01)
(52) U.S. Cl.
CPC ................ *H02J 3/40* (2013.01); *H02J 3/381* (2013.01); *H02J 2300/24* (2020.01)

(58) Field of Classification Search
CPC .......... H02J 3/40; H02J 3/381; H02J 2300/24; H02J 3/42; H02J 3/388; H02J 3/38; Y02E 10/56; G01R 19/00
(Continued)

(56) References Cited

U.S. PATENT DOCUMENTS 10,033,189 B2 *  7/2018  Fujii ..................... H02M 7/539
10,230,310 B2 *  3/2019  Loewenstern .......... H02S 50/00
(Continued)

FOREIGN PATENT DOCUMENTS

CN      203312773 U      11/2013
CN      105375519 A      3/2016
(Continued)

OTHER PUBLICATIONS

International Search Report and Written Opinion for International Application No. PCT/CN2021/118973, mailed Nov. 17, 2021.
Extended European Search Report for European Application No. 21902138.3, dated Apr. 8, 2024.
(Continued)

*Primary Examiner* — Richard Tan
(74) *Attorney, Agent, or Firm* — Wolf, Greenfield & Sacks, P.C.

(57) ABSTRACT

A medium-voltage grid-connected photovoltaic inverter system includes: a photovoltaic inverter, a medium-voltage transformer, a medium-voltage switch, and an inverter grid-connected controller. A direct current input terminal of the photovoltaic inverter is connected to a direct current bus. A low-voltage side of the medium-voltage transformer is connected to an alternating current output terminal of the photovoltaic inverter. An input terminal of the medium-voltage switch is connected to a high-voltage side of the medium-voltage transformer, and an output terminal of the medium-voltage switch is connected to a medium-voltage grid. A voltage sensor is integrated in the medium-voltage switch to detect a line voltage at the high-voltage side of the
(Continued)

medium-voltage transformer and a line voltage at a side of the medium-voltage grid and generate a grid-connected voltage detection signal. The inverter grid-connected controller is connected to a controlled terminal of the medium-voltage switch and an output terminal of the voltage sensor.

9 Claims, 2 Drawing Sheets

(58) Field of Classification Search
USPC .......................................................... 307/82
See application file for complete search history.

(56) References Cited

U.S. PATENT DOCUMENTS

| | | | |
|---|---|---|---|
| 11,159,011 B2 * | 10/2021 | Schelenz | H02J 3/42 |
| 2012/0039101 A1 * | 2/2012 | Falk | H02J 3/42 |
| | | | 363/95 |
| 2019/0157982 A1 * | 5/2019 | Brueckner | H02M 7/125 |

FOREIGN PATENT DOCUMENTS

| | | |
|---|---|---|
| CN | 211908388 U | 11/2020 |
| CN | 112398175 A | 2/2021 |
| CN | 112436557 A | 3/2021 |

OTHER PUBLICATIONS

Basu et al., A Hybrid Modular Multilevel Converter for Power Integration. IEEE Transactions on Industry Applications. Sep. 2019;55(5)5166-77.

* cited by examiner

MEDIUM-VOLTAGE PHOTOVOLTAIC GRID-CONNECTION INVERTER SYSTEM, AND PHOTOVOLTAIC POWER GENERATION SYSTEM

This present Application is a national phase of International Patent Application No. PCT/CN2021/118973, titled "MEDIUM-VOLTAGE PHOTOVOLTAIC GRID-CONNECTION INVERTER SYSTEM AND PHOTOVOLTAIC POWER GENERATION SYSTEM", filed Sep. 17, 2021, which claims the priority to Chinese patent application No. 202011426034.9, titled "MEDIUM-VOLTAGE PHOTOVOLTAIC GRID-CONNECTION INVERTER SYSTEM, AND PHOTOVOLTAIC POWER GENERATION SYSTEM", filed on Dec. 7, 2020 with the China National Intellectual Property Administration, both of which are incorporated herein by reference in their entireties.

FIELD

The present disclosure relates to the technical field of photovoltaic power generation, and in particular to a medium-voltage grid-connected photovoltaic inverter system and a photovoltaic power generation system.

BACKGROUND

In an existing technical solution, such as "grid-connected photovoltaic inverter system and photovoltaic power generation system using the same", a medium-voltage grid-connected contactor is generally connected between a high-voltage side of a booster transformer and a medium-voltage grid. Two detection terminals of a grid-connected voltage detection circuit are connected to both ends of the medium-voltage grid-connected contactor respectively. A detection result of voltages detected at two ends of the medium-voltage contactor is outputted to a first control circuit. A direct current voltage detection circuit detects a direct current voltage UDC and outputs a result to the first control circuit and a second control circuit. A grid-connected current detection circuit detects a grid-connected current at an alternating current output terminal of a photovoltaic inverter, and outputs a result to the second control circuit. The second control circuit controls the inverter to start or stop based on the detection result of the direct current voltage and the detection result of the grid-connected current. The first control circuit controls the medium-voltage grid-connected contactor to switch off or on based on a detection result of a direct current input voltage and a detection result of a grid-connected voltage, so that the photovoltaic inverter is disconnected from or connected to the grid. However, the existing technical solution has a disadvantage that an external voltage sensor is essential to detect the grid-connected voltage since no voltage sensor is integrated in the medium-voltage grid-connected contactor, resulting in a large size and high cost.

SUMMARY

A medium-voltage grid-connected photovoltaic inverter system and a photovoltaic power generation system are provided according to the present disclosure, so that the photovoltaic inverter system is connected to a medium-voltage grid without a ring main unit and an external voltage sensor.

In order to connect the photovoltaic inverter system to the medium-voltage grid without a ring main unit and an external voltage sensor, a medium-voltage grid-connected photovoltaic inverter system is provided according to the present disclosure. The medium-voltage grid-connected photovoltaic inverter system includes: a photovoltaic inverter, a medium-voltage transformer, a medium-voltage switch, and an inverter grid-connected controller. A direct current input terminal of the photovoltaic inverter is connected to a direct current bus. A low-voltage side of the medium-voltage transformer is connected to an alternating current output terminal of the photovoltaic inverter. An input terminal of the medium-voltage switch is connected to a high-voltage side of the medium-voltage transformer, and an output terminal of the medium-voltage switch is configured to be connected to a medium-voltage grid. A voltage sensor is integrated in the medium-voltage switch and is configured to detect a line voltage at the high-voltage side of the medium-voltage transformer and a line voltage at a side of the medium-voltage grid and generate a grid-connected voltage detection signal. The inverter grid-connected controller is connected to a controlled terminal of the medium-voltage switch and an output terminal of the voltage sensor. The inverter grid-connected controller is configured to control the medium-voltage switch to switch on if it is determined based on the grid-connected voltage detection signal that the line voltage currently detected at the high-voltage side of the medium-voltage transformer and the line voltage currently detected at the side of the medium-voltage grid meet a grid-connected condition.

Optionally, the medium-voltage grid-connected photovoltaic inverter system further includes a direct current bus voltage detection circuit. A detection terminal of the direct current bus voltage detection circuit is connected to the direct current bus, and an output terminal of the direct current bus voltage detection circuit is connected to the inverter grid-connected controller. The direct current bus voltage detection circuit is configured to detect a voltage of the direct current bus and generate a direct current bus voltage detection signal. The inverter grid-connected controller is further configured to control the photovoltaic inverter to start if it is determined based on the direct current bus voltage detection signal that the voltage of the direct current bus is greater than a first preset voltage threshold.

Optionally, the medium-voltage grid-connected photovoltaic inverter system further includes an alternating current bus voltage detection circuit. The alternating current bus voltage detection circuit is connected to the alternating current output terminal of the photovoltaic inverter, and is configured to detect an alternating current bus voltage outputted by the photovoltaic inverter. The inverter grid-connected controller is further configured to control the medium-voltage switch to switch on if it is determined based on the alternating current bus voltage that the line voltage currently detected at the high-voltage side of the medium-voltage transformer and the line voltage currently detected at the side of the medium-voltage grid meet the grid-connected condition.

Optionally, the medium-voltage grid-connected photovoltaic inverter system further includes a grid-connected current detection circuit. The grid-connected current detection circuit is configured to detect a grid-connected current of the medium-voltage grid-connected photovoltaic inverter system and output a current detection signal. The inverter grid-connected controller is further configured to control, after controlling the medium-voltage switch to switch on, the photovoltaic inverter to stop if it is determined based on the current detection signal and the grid-connected voltage detection signal that a grid-connected power of the medium-voltage grid-connected photovoltaic inverter system is less than a preset power threshold.

Optionally, the inverter grid-connected controller is further configured to control, after controlling the medium-voltage switch to switch on, the medium-voltage switch to switch off if it is determined based on the direct current bus voltage detection signal that the voltage of the direct current bus is less than the first preset voltage threshold for a first preset period of time.

Optionally, the grid-connected condition is that the line voltage at the high-voltage side of the medium-voltage transformer and the line voltage at the side of the medium-voltage grid have the same phase, same phase sequence and same amplitude.

Optionally, the number of the voltage sensor is two. One of the two voltage sensors is configured to detect the line voltage at the high-voltage side of the medium-voltage transformer, and the other of the two voltage sensors is configured to detect the line voltage at the side of the medium-voltage grid.

Optionally, the inverter grid-connected controller is further configured to control the medium-voltage switch to switch on in response to reception of a reactive power transmission signal.

Optionally, the medium-voltage switch includes one or more of a medium-voltage circuit breaker, a medium-voltage load switch and a medium-voltage contactor.

A photovoltaic power generation system is further provided according to the present disclosure. The photovoltaic power generation system includes a medium-voltage power system and the medium-voltage grid-connected photovoltaic inverter system.

In the present disclosure, an alternating current output side of a photovoltaic inverter is connected to a low-voltage side of a medium-voltage transformer, a high-voltage side of the medium-voltage transformer is connected to a medium-voltage switch, and an output side of the medium-voltage switch is connected to a medium-voltage grid, whereby a medium-voltage grid-connected photovoltaic inverter system based on a medium-voltage switch is formed. Moreover, a voltage sensor is integrated in the medium-voltage switch so as to detect a voltage at a grid-connected side. Therefore, before the system is connected to a grid, the inverter grid-connected controller 30 controls, in response to reception of a grid-connected command, the medium-voltage switch to switch off or on based on the grid-connected voltage detection signal, so that the system is disconnected from or connected to the grid. With the medium-voltage switch integrated with a voltage sensor according to the present disclosure, the size and the cost of the system are reduced compared with the technical solution in which an external voltage sensor is arranged.

BRIEF DESCRIPTION OF THE DRAWINGS

For more clearly illustrating technical solutions in embodiments of the present disclosure or the technical solution in the conventional technology, drawings referred to describe the embodiments or the conventional technology will be briefly described hereinafter. Apparently, the drawings in the following description show only some embodiments of the present disclosure. Other drawings may be obtained by those skilled in the art based on the structure shown in the drawings without any creative efforts.

LIST OF REFERENCE NUMERALS

Figure 1:
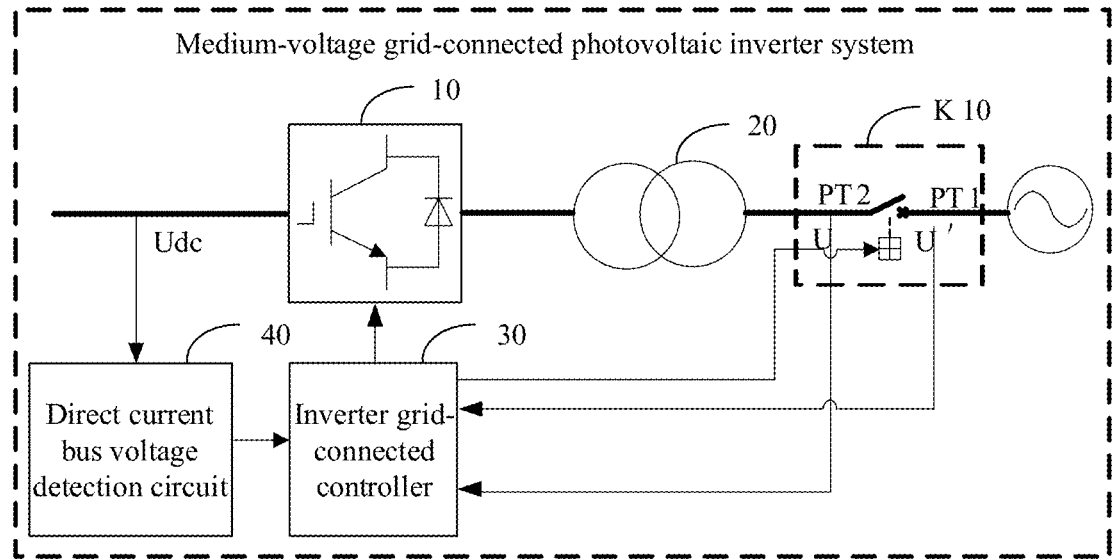
FIG. 1 is a schematic structural diagram illustrating a medium-voltage grid-connected photovoltaic inverter system according to an embodiment of the present disclosure.

| Reference numerals | Names |
| --- | --- |
| 10 | Photovoltaic inverter |
| 20 | Medium-voltage transformer |
| 30 | Inverter grid-connected controller |
| 40 | Direct current bus voltage detection circuit |
| 50 | Voltage sensor |
| 60 | Grid-connected current detection circuit |
| K10 | Medium-voltage switch |
| PT1, PT2 | Voltage sensor |

Objects, functional features and advantages of the present disclosure will be further described in conjunction with the embodiments and with reference to the drawings.

DETAILED DESCRIPTION

The technical solutions in the embodiments of the present disclosure will be described clearly and completely hereinafter in conjunction with the drawings in the embodiments of the present disclosure. Apparently, the described embodiments are only a part rather than all of the embodiments of the present disclosure. All other embodiments obtained by those skilled in the art based on the embodiments of the present disclosure without any creative work fall in the protection scope of the present disclosure.

It should be noted that, if there is directional indicator (such as up, down, left, right, front, back) in the embodiments of the present disclosure, the directional indicator is only for explaining a relative position, a relative movement or the like between components in a certain posture (as shown in the drawings). The directional indicator varies with the posture.

In addition, if there are descriptions related to "first" and "second" in the embodiments of the present disclosure, the descriptions of "first" and "second" are only for illustration purposes, rather than understood as indicating or implying its relative importance or implicitly indicating the number of the indicated technical features. Therefore, the feature defined with "first" and "second" includes at least one feature explicitly or implicitly. In addition, technical solutions in the various embodiments may be combined with each other, and the combined technical solution is to be implemented by those skilled in the art. A combination of technical solutions that is contradictory or impossible to be implemented does not exist and is not within the protection scope of the present disclosure.

A medium-voltage grid-connected photovoltaic inverter system is provided according to the present disclosure. The medium-voltage grid-connected photovoltaic inverter system is applied to a photovoltaic power generation system.

Referring to FIGS. 1 to 4, in an embodiment of the present disclosure, the medium-voltage grid-connected photovoltaic inverter system includes: a photovoltaic inverter 10, a medium-voltage transformer 20, a medium-voltage switch K10, and an inverter grid-connected controller 30.

A direct current input terminal of the photovoltaic inverter 10 is connected to a direct current bus.

A low-voltage side of the medium-voltage transformer 20 is connected to an alternating current output terminal of the photovoltaic inverter 10.

An input terminal of the medium-voltage switch K10 is connected to a high-voltage side of the medium-voltage transformer 20, and an output terminal of the medium-voltage switch is configured to be connected to a medium-voltage grid. Two voltage sensors PT1 and PT2 are integrated in the medium-voltage switch K10. The voltage sensor PT2 is configured to detect a line voltage U at the high-voltage side of the medium-voltage transformer 20, and the voltage sensor PT1 is configured to detect a line voltage U' at the side of the medium-voltage grid. Then, a grid-connected voltage detection signal is generated.

The inverter grid-connected controller 30 is connected to a controlled terminal of the medium-voltage switch K10 and an output terminal of the voltage sensor PT1 and an output terminal of the voltage sensor PT2. The inverter grid-connected controller 30 is configured to control, based on the grid-connected voltage detection signal, the medium-voltage switch to switch off so that the photovoltaic inverter system is disconnected from the grid or to switch on so that the photovoltaic inverter system is connected to the grid.

In this embodiment, the inverter converts direct current power generated by a solar cell or direct current power from a battery into alternating current power required by a load. There may be multiple inverters in an inverter system. Respective alternating current sides of the multiple inverters may be connected in parallel directly, or via another device such as a switch. The medium-voltage transformer 20 is configured to step-up a low voltage to a medium-voltage. A transformation ratio, a voltage level, a power level and a type of the transformer each vary with the inverter system. The transformer may be a double split transformer or a double-winding transformer, which is not specifically limited herein. The medium-voltage switch K10 may be one of a medium-voltage circuit breaker, a medium-voltage load switch or a medium-voltage contactor. It can be understood that, in this embodiment, the medium-voltage switch K10 includes, but is not limited to, the above switches via which the inverter system is connected to or disconnected from the grid. In other embodiments, the medium-voltage switch K10 may include another switch, which is not limited herein. Moreover, a medium-voltage switch K10 between two photovoltaic power generation systems may be identical to or different from a medium-voltage switch K10 between other two photovoltaic power generation systems. Each phase at the output end of the medium-voltage switch K10 includes two terminals. In the photovoltaic power generation system including the medium-voltage grid-connected photovoltaic inverter system, output terminals of medium-voltage switches K10 respectively in the multiple medium-voltage grid-connected photovoltaic inverter systems are directly connected to each other via the bus cable, and a medium-voltage switch K10 in a first of the multiple medium-voltage grid-connected photovoltaic inverter systems and a medium-voltage switch K10 in a last of the multiple medium-voltage grid-connected photovoltaic inverter systems each are connected to a medium-voltage power system, to form a ring network.

The voltage sensors PT2 and PT1, such as a voltage detection chip and a voltage detection probe, are integrated at an input side and an output side of the medium-voltage switch K10, to detect a line voltage U at the high-voltage side of the medium-voltage transformer 20 in a photovoltaic power generation system and a line voltage U' at a side of the medium-voltage grid, respectively. Then a grid-connected voltage detection signal is generated. With the voltage sensors PT1 and PT2 integrated in the medium-voltage switch K10, the size of the system is not increased and the production cost of the system is reduced. In addition, the line voltage at the high-voltage side of the medium-voltage transformer 20 and the line voltage at the side of the medium-voltage grid are detected by the voltage sensors PT2 and PT1 integrated in the medium-voltage switch K10, so that the line voltage at a grid-connected point can be monitored in real time.

The inverter grid-connected controller 30 performs communications, and implements functions such as medium-voltage measurement and control, and intelligent control on medium-voltage switching for a power station. The inverter grid-connected controller 30 is configured to, in response to various detection signals, for example, a current detection signal of the photovoltaic power generation system, control the medium-voltage switch K10 to switch on in order to connect the photovoltaic power generation system to the grid, that is, in response to reception of a grid-connected command.

In an embodiment, the medium-voltage grid-connected photovoltaic inverter system further includes: a direct current bus voltage detection circuit 40. A detection terminal of the direct current bus voltage detection circuit 40 is connected to the direct current bus. An output terminal of the direct current bus voltage detection circuit 40 is connected to the inverter grid-connected controller 30. The direct current bus voltage detection circuit 40 is configure to detect a voltage of the direct current bus, and generate a direct current bus voltage detection signal.

The inverter grid-connected controller 30 is further configured to control the photovoltaic inverter 10 to start if it is determined based on the direct current bus voltage detection signal that the voltage of the direct current bus is greater than a first preset voltage threshold.

In this embodiment, the direct current bus voltage detection circuit 40 may be implemented by a direct current bus voltage transformer. The direct current bus voltage detection circuit 40 detects a direct current bus voltage Udc at the input terminal of the photovoltaic inverter 10, and sends a generated direct current bus voltage detection signal to the inverter grid-connected controller 30. The first preset voltage threshold is a minimum grid-connected voltage, that is, a minimum startup voltage. In a case that the photovoltaic inverter 10 is in a sleep mode, the inverter grid-connected controller 30 controls the photovoltaic inverter 10 to start if it is determined based on the direct current bus voltage detection signal that the voltage of the direct current bus is greater than the first preset voltage threshold, that is, the direct current bus voltage detected by the direct current bus voltage detection circuit is greater than the preset minimum startup voltage.

In a case that the photovoltaic inverter 10 is connected to the grid already, the photovoltaic inverter 10 stops in response to a result that the direct current bus voltage Udc is less than the minimum startup voltage. That is, the photovoltaic inverter 10 switches to the sleep mode. The inverter grid-connected controller 30 sends an opening command to the medium-voltage switch K10 in response to a determination result that the direct current bus voltage inputted to the photovoltaic inverter 10 is less than a minimum operation voltage, to switch off the medium-voltage switch K10, and the medium-voltage grid-connected inverter system based on the medium-voltage switch K10 is disconnected from the grid. The minimum operation voltage is 1.414 times a ratio of a voltage at any terminal of the medium-voltage switch to a transformation ratio of the booster transformer.

In the present disclosure, an alternating current output side of a photovoltaic inverter 10 is connected to a low-voltage side of a medium-voltage transformer 20, a high-voltage side of the medium-voltage transformer 20 is connected to a medium-voltage switch K10, and an output side of the medium-voltage switch K10 is connected to a medium-voltage grid, whereby a medium-voltage grid-connected photovoltaic inverter system based on a medium-voltage switch K10 is formed. Moreover, voltage sensors PT2 and PT1 are respectively integrated on the input side and output side of the medium-voltage switch K10, so as to detect a voltage at a grid-connected side. Therefore, before the system is connected to a grid, the inverter grid-connected controller 30 controls, in response to reception of a grid-connected command, the medium-voltage switch to switch off or on based on the grid-connected voltage detection signal, so that the system is disconnected from or connected to the grid. With the medium-voltage switch K10 integrated with the voltage sensors PT2 and PT1 according to the present disclosure, the size and the cost of the system are reduced compared with the technical solution in which an external voltage sensor is arranged. A medium-voltage grid-connected photovoltaic inverter system based on a switch integrated with a voltage sensor is provided according to the present disclosure. An alternating current output side of a photovoltaic inverter is connected to a low-voltage side of a medium-voltage transformer, a high-voltage side of the medium-voltage transformer is connected to a medium-voltage switch (including but not limited to a medium-voltage circuit breaker, a contactor, a load switch and other medium-voltage switchgear) integrated with a voltage sensor. An output side of the medium-voltage switch is connected to a medium-voltage grid. The integrated voltage sensor is configured to detect the voltage at the input side and the voltage at the output side of the medium-voltage switch. The direct current bus voltage detection circuit is configured to detect the bus voltage at the direct current side of the inverter. At night or on a cloudy day, the photovoltaic system does not generate electricity, and the inverter is in a sleep mode. The medium-voltage switch is controlled to be switched off, so that the medium-voltage transformer is disconnected from the grid, thereby avoiding no-load loss of the transformer. When the inverter is to send reactive power to the grid, the medium-voltage switch is controlled to be switched on.

Figure 2:
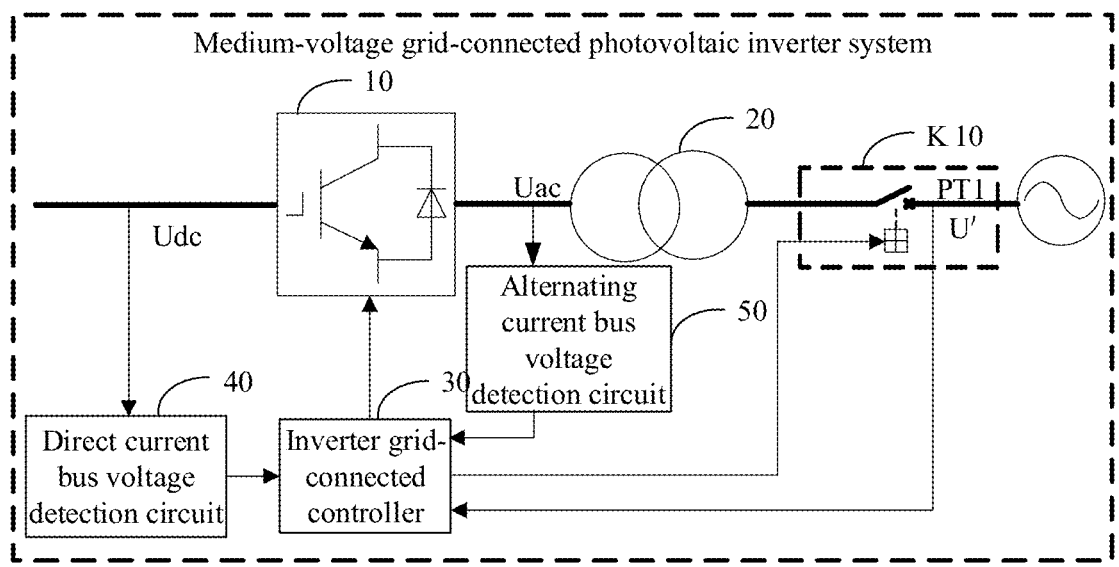
FIG. 2 is a schematic structural diagram illustrating a medium-voltage grid-connected photovoltaic inverter system according to another embodiment of the present disclosure.
Figure 3:
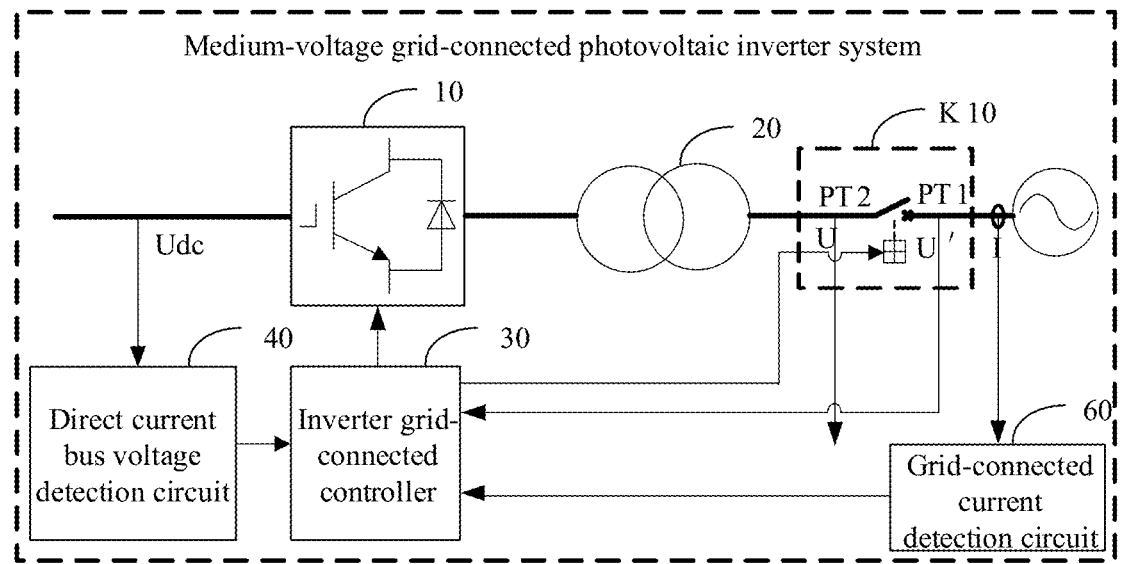
FIG. 3 is a schematic structural diagram illustrating a medium-voltage grid-connected photovoltaic inverter system according to another embodiment of the present disclosure.

Referring to FIGS. 1 to 3, in an embodiment, the inverter grid-connected controller 30 is configured to control the medium-voltage switch K10 to switch on if it is determined based on the grid-connected voltage detection signal that a line voltage currently detected at the high-voltage side of the medium-voltage transformer 20 and a line voltage currently detected at the side of the medium-voltage grid meet a grid-connected condition.

The grid-connected condition is that the line voltage at the high-voltage side of the medium-voltage transformer 20 and the line voltage at the side of the medium-voltage grid have the same phase, same phase sequence and same amplitude.

The line voltage U' detected by the voltage sensor PT1 may include a line voltage Uab' between an A-phase and a B-phase and a line voltage Ubc' between a B-phase and a C-phase. The line voltage U detected by the voltage sensor PT2 may include a line voltage Uab between the A-phase and the B-phase and a line voltage Ubc between the B-phase and the C-phase. In a case that Uab', Ubc', Uab and Ubc all have the same amplitude, Uab' and Uab have the same phase, and Ubc' and Ubc have the same phase, a line voltage between a B-phase and a C-phase and a line voltage between an A-phase and a C-phase at each of the two detection terminals (i.e., Ubc', Uac', Ubc and Uac) may be detected separately. Alternatively, a line voltage between an A-phase and a B-phase and a line voltage between an A-phase and a C-phase at each of the two detection terminals (i.e., Uab', Uac', Uab, and Uac) are detected separately. The subsequent comparison and determination may refer to the above description, and are not repeated here.

In this embodiment, the medium-voltage grid-connected photovoltaic inverter system based on the medium-voltage switch K10 is off-grid, the photovoltaic inverter 10 is started and is in the sleep mode. The grid-connected voltage detection circuit detects the line voltage U at the high-voltage side of the medium-voltage transformer 20 and the line voltage U' at the side of the medium-voltage grid, and sends a grid-connected voltage detection signal to the inverter grid-connected controller 30. If it is determined that the line voltage currently detected at the high-voltage side of the medium-voltage transformer 20 and the line voltage currently detected at the side of the medium-voltage grid meet the grid-connected condition, the inverter grid-connected controller 30 sends a closing command to the medium-voltage switch K10, so that the medium-voltage switch is switched on and the inverter is connected to the grid. The grid-connected condition is that the line voltage at the high-voltage side of the medium-voltage transformer 20 and the line voltage at the side of the medium-voltage grid have the same phase, same phase sequence and same amplitude.

Referring to FIG. 2, in another embodiment, the medium-voltage grid-connected photovoltaic inverter system further includes an alternating current bus voltage detection circuit 50.

The alternating current bus voltage detection circuit 50 is connected to the alternating current output terminal of the photovoltaic inverter 10, and is configured to detect an alternating current bus voltage outputted by the photovoltaic inverter 10.

The inverter grid-connected controller 30 is further configured to control the medium-voltage switch K10 to switch on if it is determined based on the alternating current bus voltage that the line voltage currently detected at the high-voltage side of the medium-voltage transformer 20 and the line voltage currently detected at the side of the medium-voltage grid meet the grid-connected condition.

In this embodiment, the medium-voltage grid-connected photovoltaic inverter system based on the switch integrated with the voltage sensor PT1 is off-grid, after the photovoltaic inverter 10 is started, the alternating current bus voltage detection circuit 50 detects the alternating current bus voltage Uac of the photovoltaic inverter 10. The voltage sensor PT1 integrated in the medium-voltage switch K10 detects the line voltage U' at the grid-connected side of the medium-voltage switch K10. A detection result is then sent to the inverter grid-connected controller 30. The inverter grid-connected controller converts Uac to a voltage at the medium-voltage side of the medium-voltage switch K10 and compares the converted voltage with the line voltage U' at the grid-connected side. If it is determined that the grid-connected condition is met, the inverter grid-connected controller 30 sends a closing command to the medium-voltage switch K10, to switch on the medium-voltage switch K10, so that the inverter is connected to the grid. In this embodiment, in a case that the alternating current bus voltage of the photovoltaic inverter 10 is detected by the alternating current bus voltage detection circuit and is converted into the voltage at the medium-voltage side of the medium-voltage switch K10, only the voltage sensor PT1 is integrated at the output side of the medium-voltage switch K10 and no voltage sensor is integrated at the input side of the medium-voltage switch K10. In other embodiments, a voltage sensor and the alternating bus voltage detection circuit 50 for detecting the output voltage of the photovoltaic inverter 10 both are arranged at the input side of the medium-voltage switch K10, so as to obtain the voltage at the medium-voltage side of the medium-voltage switch K10, thereby improving detection accuracy of the system.

Referring to FIG. 3, in an embodiment, the medium-voltage grid-connected photovoltaic inverter system further includes a grid-connected current detection circuit 60. The grid-connected current detection circuit 60 is configured to detect a grid-connected current of the medium-voltage grid-connected photovoltaic inverter system and output a current detection signal.

The inverter grid-connected controller 30 is further configured to control, after controlling the medium-voltage switch K10 to switch on, the photovoltaic inverter 10 to stop, if it is determined based on the current detection signal and the grid-connected voltage detection signal that a grid-connected power of the medium-voltage grid-connected photovoltaic inverter system is less than a preset power threshold.

In this embodiment, the grid-connected current detection circuit 60 may be implemented by a current sensor. The inverter grid-connected controller 30, in response to reception of the grid-connected command and when it is determined based on the current at the grid-connected side detected by the current sensor, that is, the current detected by a grid-connected current-current sensor of the medium-voltage grid-connected photovoltaic inverter system that the medium-voltage side is short-circuited or a contact of the medium-voltage switch K10 is welded, stops the medium-voltage grid-connected photovoltaic inverter system from being connected to the grid. In a case that the medium-voltage grid-connected photovoltaic inverter system is off-grid, it is determined that the electrical connection between the medium-voltage side and the grid-connected side is cut off if the current sensor detects that the grid-connected current is less than the preset current threshold, for example, the grid-connected current I is 0 A or approximates to 0 A. The inverter grid-connected controller 30 controls the photovoltaic inverter 10 to start, or controls the medium-voltage switch K10 to switch on. It is determined that a short circuit occurs between the medium-voltage side and the grid-connected side if the current sensor detects that the grid-connected current I is greater than the preset current threshold. The inverter grid-connected controller 30 controls the photovoltaic inverter 10 to stop, that is, suspend the startup, or controls the medium-voltage switch K10 to switch off or remains open.

In this embodiment, the preset power threshold may be a minimum grid-connected power. In a case that the photovoltaic inverter 10 is connected to the grid already, the current sensor outputs a current detected at the grid-connected side to the inverter grid-connected controller 30. The inverter grid-connected controller 30 calculates a grid-connected power P based on the current at the grid-connected side and a grid-connected voltage detection signal, that is, the line voltage at the high-voltage side of the medium-voltage transformer 20, and determines whether the grid-connected power P is less than a preset minimum grid-connected power P0. If it is determined that the grid-connected power P is less than the preset minimum grid-connected power P0, the inverter grid-connected controller 30 generates an inverter stop control signal to control the photovoltaic inverter 10 to stop. That is, the photovoltaic inverter 10 switches to the sleep mode.

Referring to FIGS. 1 to 4, in an embodiment, the inverter grid-connected controller 30 is further configured to, after controlling the medium-voltage switch K10 to switch on, control the medium-voltage switch K10 to switch off if it is determined based on the direct current bus voltage detection signal that the voltage of the direct current bus is less than the first preset voltage threshold for a first preset period of time.

In this embodiment, a voltage fluctuation may occur in the process that a photovoltaic cell assembly or a storage battery supplies electrical energy to the direct current bus, so that the direct current bus voltage detection circuit 40 may detect that the direct current bus voltage Udc is less than the minimum grid-connected voltage for only a short period of time. In this case, the inverter grid-connected controller 30 sending an opening command to the medium-voltage switch K10 may result in malfunction. Therefore, in this embodiment, after the photovoltaic inverter 10 switches to the sleep mode and when the direct current bus voltage Udc is less than the minimum grid-connected voltage for a period of time (that is, the first preset period of time), the inverter grid-connected controller 30 sends the opening command to the medium-voltage switch, the medium-voltage switch K10 is switched off, and the medium-voltage grid-connected inverter system based on the medium-voltage switch K10 is disconnected from the grid.

In this embodiment, with the medium-voltage switch K10, the photovoltaic power generation system is connected to a grid at the medium-voltage side rather than a low-voltage side. The medium-voltage switch K10 is controlled to switch on, so that the photovoltaic power generation system is connected to the grid. That is, after the photovoltaic inverter 10 is started, the medium-voltage switch K10 is switched on, so that the photovoltaic system is connected to the grid. After the photovoltaic inverter 10 stops, the medium-voltage switch K10 is switched off, so that the photovoltaic system is disconnected from the grid. In this embodiment, the booster transformer is disconnected from the medium-voltage grid while the medium-voltage switch K10 is switched off, without consuming grid energy when the photovoltaic inverter 10 is in the sleep mode. In this embodiment, the no-load loss when the booster transformer is in a sleep mode can also be avoided, thereby improving the efficiency of the photovoltaic system.

Referring to FIGS. 1 to 4, in an embodiment, the inverter grid-connected controller 30 is further configured to control the medium-voltage switch K10 to switch on in response to reception of a reactive power transmission signal.

In this embodiment, the inverter grid-connected controller 30 may also receive a reactive power transmission signal. The controller may receive a nighttime reactive power transmission signal (SVG work instruction) issued by an upper-level grid dispatching center. When the photovoltaic inverter 10 is to send reactive power to the grid at night, the inverter grid-connected controller 30 sends a closing command to the medium-voltage switch based on the reactive power transmission signal, so that the medium-voltage switch is switched on, and the inverter is connected to the grid, thereby realizing medium-voltage grid connection and outputting reactive power. In order to stop the nighttime SVG function, the inverter grid-connected controller 30 sends an opening command to the medium-voltage switch, the medium-voltage switch is switched off, and the medium-voltage grid-connected inverter system based on the medium-voltage switch K10 is disconnected from the grid. In this way, the medium-voltage transformer 20 is connected to the grid while sending reactive power to the grid, thereby avoiding no-load loss of the medium-voltage transformer 20 in the ring network, and reducing power loss of the system compared with the conventional solution.

The operation principle of the medium-voltage grid-connected photovoltaic inverter system according to the present disclosure applied to the photovoltaic power generation system is described in combination with the above embodiments of the medium-voltage grid-connected photovoltaic inverter system.

A medium-voltage grid-connected photovoltaic inverter system based on a medium-voltage switch integrated with a voltage sensor includes a photovoltaic inverter 10, a medium-voltage transformer 20, a medium-voltage switch K10 integrated with a voltage sensor (including but not limited to a medium-voltage circuit breaker, a contactor, a load switch and other medium-voltage switchgear), a direct current bus voltage detection circuit 40, a inverter grid-connected controller 30.

An alternating current output side of the photovoltaic inverter 10 is connected to a low-voltage side of the medium-voltage transformer 20, and a high-voltage side of the medium-voltage transformer 20 is connected to the medium-voltage switch K10. The direct current bus voltage detection circuit 40 detects a direct current bus voltage Udc of the photovoltaic inverter 10. The voltage sensors PT2 and PT1 integrated in the medium-voltage switch K10 detect the line voltages U (i.e., the voltage at the high-voltage side of the transformer) and U' (i.e., a grid voltage) at the input and output sides of the medium-voltage switch K10, respectively. The direct current bus voltage detection circuit 40 and the integrated voltage sensor send the detection signal to the inverter grid-connected controller 30. The inverter grid-connected controller 30 controls the medium-voltage switch K10 to switch off or on.

In a case that the medium-voltage grid-connected photovoltaic inverter system based on the switch integrated with the voltage sensor is off-grid, after the photovoltaic inverter 10 is started, the voltage sensors PT2 and PT1 integrated in the medium-voltage switch K10 detect the line voltages U and U' of at the input and output sides of the medium-voltage switch K10 respectively, and then send a detection result to the inverter grid-connected controller 30. If it is determined that the grid-connected condition is met, the grid-connected controller 30 sends a closing command to the medium-voltage switch K10, so that the medium-voltage switch K10 is switched on, and the inverter is connected to the grid.

In a case that the medium-voltage grid-connected photovoltaic inverter system based on the switch integrated with the voltage sensor is connected to the grid already, the direct current bus voltage detection circuit 40 detects the direct current bus voltage Udc inputted to the inverter, and sends the detection result to the inverter grid-connected control system. The photovoltaic inverter 10 switches to the sleep mode when Udc is lower than the minimum grid-connected voltage for a period of time. The grid-connected controller 30 sends the opening command to the medium-voltage switch K10, to switch off the medium-voltage switch K10, so that the medium-voltage grid-connected photovoltaic inverter system based on the switch integrated with the voltage sensor is disconnected from the grid.

When the photovoltaic inverter 10 is to send reactive power to the grid at night, the grid-connected controller 30 sends the closing command to the medium-voltage switch K10 so as to connect the photovoltaic inverter 10 to the grid.

A photovoltaic power generation system is further provided according to the present disclosure. The photovoltaic power generation system includes a medium-voltage power system and multiple above-mentioned medium-voltage grid-connected photovoltaic inverter systems. The detailed structure of the medium-voltage grid-connected photovoltaic inverter system may refer to the above-mentioned embodiments, and thus is not repeated here. It can be understood that, since the photovoltaic power generation system according to the present disclosure includes the above medium-voltage grid-connected photovoltaic inverter system, the embodiments of the photovoltaic power generation system according to the present disclosure include all technical solutions in all embodiments of the medium-voltage grid-connected photovoltaic inverter system, and have the same technical effects as the embodiments of the medium-voltage grid-connected photovoltaic inverter system, which are not repeated here.

Figure 4:
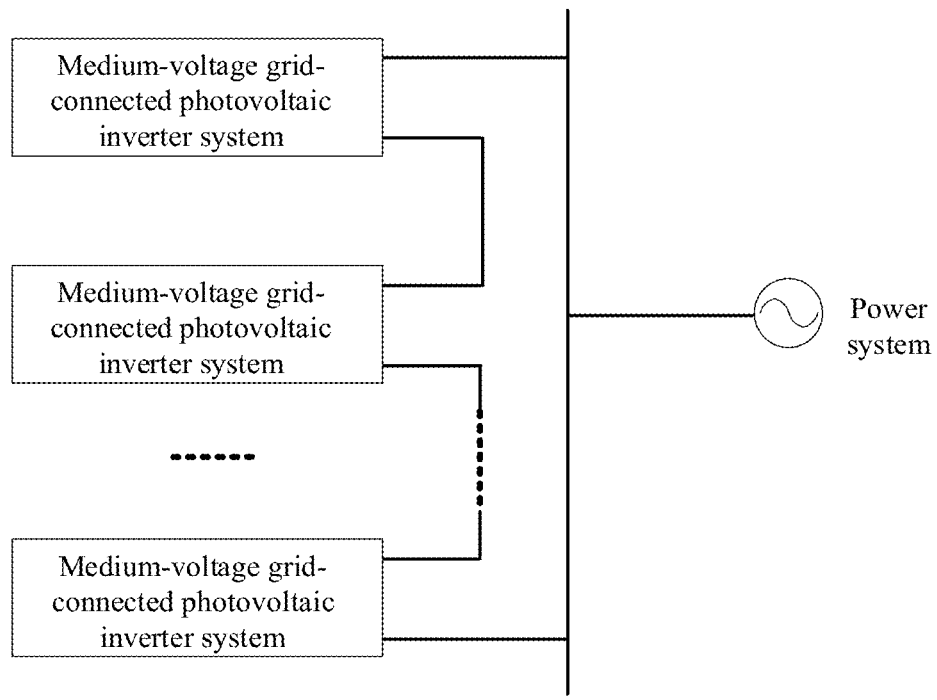
FIG. 4 is a schematic structural diagram illustrating a photovoltaic power generation system according to an embodiment of the present disclosure.

Referring to FIG. 4, in an embodiment, the number of medium-voltage grid-connected photovoltaic inverter system is more than one, and the more than one medium-voltage grid-connected photovoltaic inverter systems are connected to each other via the output terminals of respective medium-voltage switches K10.

In this embodiment, in the photovoltaic power generation system including the more than one voltage grid-connected photovoltaic inverter system, output ends of medium-voltage switches respectively in the medium-voltage grid-connected photovoltaic inverter systems are directly connected to each other via the bus cable, and a medium-voltage switch in a first of the medium-voltage grid-connected photovoltaic inverter systems and a medium-voltage switch in a last of the multiple medium-voltage grid-connected photovoltaic inverter systems each are connected to the medium-voltage power system, to form a ring network. In order to form a ring network, that is, be connected to the grid, all medium-voltage grid-connected photovoltaic inverter systems except a first medium-voltage grid-connected photovoltaic inverter system and a last medium-voltage grid-connected photovoltaic inverter system are connected to each other via the output ends of their respective medium-voltage switches and the bus cable, and the medium-voltage switch in the first medium-voltage grid-connected photovoltaic inverter system and the medium-voltage switch in the last medium-voltage grid-connected photovoltaic inverter system each are connected to the medium-voltage power system, thereby forming the ring network finally. In case of an open circuit, that is, when the inverter system is disconnected from the grid, the two output terminals in the inverter system are still connected to an adjacent medium-voltage grid-connected photovoltaic inverter system. That is, a single off-grid medium-voltage grid-connected photovoltaic inverter system does not affect the ring network formed by other medium-voltage grid-connected photovoltaic inverter systems.

Only optional embodiments of the present disclosure are described above, and are not intended to limit the scope of the present disclosure. Any equivalent structural transformation made based on the specification and the drawings of the present disclosure or direct/indirect application in other related technical fields without departing from the concept of the present disclosure is included in the protection scope of the present disclosure.

The invention claimed is:

1. A medium-voltage grid-connected photovoltaic inverter system, comprising:
　a photovoltaic inverter, wherein a direct current input terminal of the photovoltaic inverter is connected to a direct current bus;
　a medium-voltage transformer, wherein a low-voltage side of the medium-voltage transformer is connected to an alternating current output terminal of the photovoltaic inverter;
　a medium-voltage switch, wherein an input terminal of the medium-voltage switch is connected to a high-voltage side of the medium-voltage transformer, an output terminal of the medium-voltage switch is configured to be connected to a medium-voltage grid, and a voltage sensor is integrated in the medium-voltage switch and is configured to detect a line voltage at the high-voltage side of the medium-voltage transformer and a line voltage at a side of the medium-voltage grid and generate a grid-connected voltage detection signal; and
　an inverter grid-connected controller, wherein the inverter grid-connected controller is connected to a controlled terminal of the medium-voltage switch and an output terminal of the voltage sensor, and is configured to control the medium-voltage switch to switch on if it is determined based on the grid-connected voltage detection signal that the line voltage currently detected at the high-voltage side of the medium-voltage transformer and the line voltage currently detected at the side of the medium-voltage grid meet a grid-connected condition,
　a grid-connected current detection circuit, wherein the grid-connected current detection circuit is configured to detect a grid-connected current of the medium-voltage grid-connected photovoltaic inverter system and output a current detection signal,
　wherein the inverter grid-connected controller is further configured to control, after controlling the medium-voltage switch to switch on, the photovoltaic inverter to stop if it is determined based on the current detection signal and the grid-connected voltage detection signal that a grid-connected power of the medium-voltage grid-connected photovoltaic inverter system is less than a preset power threshold.

2. The medium-voltage grid-connected photovoltaic inverter system according to claim 1, further comprising:
　a direct current bus voltage detection circuit, wherein a detection terminal of the direct current bus voltage detection circuit is connected to the direct current bus, an output terminal of the direct current bus voltage detection circuit is connected to the inverter grid-connected controller, and the direct current bus voltage detection circuit is configured to detect a voltage of the direct current bus and generate a direct current bus voltage detection signal,
　wherein the inverter grid-connected controller is further configured to control the photovoltaic inverter to start if it is determined based on the direct current bus voltage detection signal that the voltage of the direct current bus is greater than a first preset voltage threshold.

3. The medium-voltage grid-connected photovoltaic inverter system according to claim 2, further comprising:
　an alternating current bus voltage detection circuit, wherein the alternating current bus voltage detection circuit is connected to the alternating current output terminal of the photovoltaic inverter, and is configured to detect an alternating current bus voltage outputted by the photovoltaic inverter,
　wherein the inverter grid-connected controller is further configured to control the medium-voltage switch to switch on if it is determined based on the alternating current bus voltage that the line voltage currently detected at the high-voltage side of the medium-voltage transformer and the line voltage currently detected at the side of the medium-voltage grid meet the grid-connected condition.

4. The medium-voltage grid-connected photovoltaic inverter system according to claim 3, wherein the inverter grid-connected controller is further configured to control, after controlling the medium-voltage switch to switch on, the medium-voltage switch to switch off if it is determined based on the direct current bus voltage detection signal that the voltage of the direct current bus is less than the first preset voltage threshold for a first preset period of time.

5. The medium-voltage grid-connected photovoltaic inverter system according to claim 3, wherein the grid-connected condition is that the line voltage at the high-voltage side of the medium-voltage transformer and the line voltage at the side of the medium-voltage grid have the same phase, same phase sequence and same amplitude.

6. The medium-voltage grid-connected photovoltaic inverter system according to claim 1, wherein the number of the voltage sensor is two, one of the two voltage sensors is configured to detect the line voltage at the high-voltage side of the medium-voltage transformer, and the other of the two voltage sensors is configured to detect the line voltage at the side of the medium-voltage grid.

7. The medium-voltage grid-connected photovoltaic inverter system according to claim 1, wherein the inverter grid-connected controller is further configured to control the medium-voltage switch to switch on in response to reception of a reactive power transmission signal.

8. The medium-voltage grid-connected photovoltaic inverter system according to claim 1, wherein the medium-voltage switch comprises one or more of a medium-voltage circuit breaker, a medium-voltage load switch, and a medium-voltage contactor.

9. A photovoltaic power generation system, comprising:
　a medium-voltage power system; and
　the medium-voltage grid-connected photovoltaic inverter system according to claim 1.

* * * * *